(12) United States Patent
Steinruecken et al.

(10) Patent No.: US 6,922,052 B2
(45) Date of Patent: Jul. 26, 2005

(54) MEASURING DEVICE FOR CONTACTLESS DETECTING A FERROMAGNETIC OBJECT

(75) Inventors: Heinrich Steinruecken, Ludwigsburg (DE); David Heisenberg, Gerlingen (DE); Michael Schulz, Schwiebordingen (DE); Rasmus Rettig, Gerlingen (DE); Martin Haas, Oberstenfeld (DE); Klemens Gintner, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 134 days.

(21) Appl. No.: 10/204,688
(22) PCT Filed: Feb. 16, 2001
(86) PCT No.: PCT/DE01/00589
§ 371 (c)(1),
(2), (4) Date: Feb. 7, 2003
(87) PCT Pub. No.: WO01/63213
PCT Pub. Date: Aug. 30, 2001

(65) Prior Publication Data
US 2003/0155909 A1 Aug. 21, 2003

(30) Foreign Application Priority Data
Feb. 26, 2000 (DE) .......................................... 100 09 173

(51) Int. Cl.[7] .............................. G01B 7/14; G01B 7/30; G01R 33/06; H01L 43/06
(52) U.S. Cl. .............................. 324/207.2; 324/207.21; 324/207.22; 324/207.24; 324/207.25
(58) Field of Search .................. 324/207.2, 207.21, 324/207.25, 207.23, 207.24, 207.26, 207.11, 207.13, 174, 117 H, 207.22; 327/511; 365/9; 338/32 R, 32 H (56) References Cited
U.S. PATENT DOCUMENTS

| | | | | |
|---|---|---|---|---|
| 4,204,158 A | * | 5/1980 | Ricouard et al. | ........ 324/207.2 |
| 4,803,426 A | * | 2/1989 | Odagawa et al. | ........ 324/207.2 |
| 4,859,941 A | * | 8/1989 | Higgs et al. | ............. 324/207.2 |
| 4,935,698 A | | 6/1990 | Kawaji | |
| 5,321,355 A | | 6/1994 | Luetzow | |
| 6,107,793 A | * | 8/2000 | Yokotani et al. | ........ 324/207.21 |
| 6,127,821 A | * | 10/2000 | Ramsden et al. | ............ 324/202 |

FOREIGN PATENT DOCUMENTS

| | | |
|---|---|---|
| DE | 37 04 729 A1 | 8/1988 |
| DE | 43 27 796 A1 | 2/1995 |
| DE | 196 22 561 A1 | 12/1996 |
| EP | 0 273 129 A2 | 7/1988 |
| EP | 0 283 291 A | 9/1988 |
| GB | 2 100 443 A | 12/1982 |
| WO | 97 43603 A | 11/1997 |

\* cited by examiner

*Primary Examiner*—Jay Patidar
*Assistant Examiner*—Kenneth J Whittington
(74) *Attorney, Agent, or Firm*—Michael J. Striker (57) ABSTRACT

A measuring device for contactless detection of a ferromagnetic object, comprising at least one magnet; a magnetic field-sensitive element arranged so that an air gap is provided between the magnetic field-sensitive element and the ferromagnetic object; and a soft-magnetic component located between magnet and the magnetic field-sensitive element on a face of the magnet which points in a direction of the ferromagnetic object to be detected, said soft-magnetic component being formed as a cap-shaped element that has a recess that is open in a direction away from said magnetic field-sensitive element to house the magnet and an opening that is open in a direction of the magnetic field-sensitive element, to house the magnet and opening that is open in a direction of the magnetic field-sensitive element, the soft-magnetic component having a first side wall defining said recess and also having a portion which forms a second side wall defining said opening, said first side wall and said second side wall being in alignment with one another.

6 Claims, 5 Drawing Sheets

MEASURING DEVICE FOR CONTACTLESS DETECTING A FERROMAGNETIC OBJECT

BACKGROUND OF THE INVENTION

The present invention concerns a measuring device for contactless detection of a ferromagnetic object.

Measuring devices of this nature generally comprise an arrangement of a magnet structure and an integrated control circuit chip having a Hall element, whereby the chip is located on one end of the magnet structure and in the magnetic field that is formed by this magnet structure. The Hall element produces an electrical signal based on the strength of the magnetic field perpendicular to the plane of the Hall element. If a ferromagnetic object now approaches the Hall element, the strength of the magnetic field perpendicular to the Hall element changes. As a result, the distance of the ferromagnetic object away from the Hall element can be represented by an electrical signal produced by the Hall element. Hall sensors of this type are used to detect rotational speeds or certain positions of toothed trigger wheels (gears) in motor vehicles, e.g., for an antilock braking system or engine management.

For example, to realize a small offset field, measuring devices having two closely adjacent Hall elements were proposed that are interconnected electrically in such a fashion that they cancel each other out in the normal state. This makes it possible to produce a good signal, but the two Hall elements must have absolutely identical behavior. This is difficult to achieve in series production.

Furthermore, a Hall-effect sensor is made known in DE-196 22 561, in the case of which a Hall element located on a control circuit chip is situated between a trigger wheel and a magnet structure. The magnet structure is designed so that a north magnetic pole and a south magnetic pole are located next to each other and both of them are located adjacent to the Hall element.

Furthermore, a magnetic field source is made known in EP-0 273 129, in the case of which an annular magnet is provided as the permanent magnet. A Hall generator is associated with the opening of the annular magnet in such a fashion that the axis of the Hall generator and the axis of the annular magnet basically coincide, and, when the magnetic circuit is open, the Hall generator is located in a space having minimal magnetic induction formed by field displacement within the annular magnet.

SUMMARY OF THE INVENTION

A device, according to the invention, for contactless detection of a ferromagnetic object has the advantage, in contrast, that a portion of the magnetic flux is shunted away by the soft-magnetic component located on one side of a permanent magnet between the permanent magnet and a Hall element. The magnetic flux density is therefore reduced in the space around the soft-magnetic component located on the permanent magnet. A magnetic circuit having a minimized offset field can be realized as a result in the case of closely adjacent Hall elements, in particular when measurements are carried out according to the differential principle, Hall elements having a relatively large tolerance range can be used, since the different behavior of the Hall elements has a relatively minimal effect. It is furthermore advantageous in terms of the design of the measuring device according to the invention that, due to the soft-magnetic component located on the permanent magnet, a strong change in the magnetic flux density occurs in the presence of a ferromagnetic object. This means that greater accuracy of the measuring device can be obtained by means of the great relative change in the magnetic flux density that occurs when a ferromagnetic object approaches. The measuring device according to the invention also has a simple design, since only one Hall element is required, and the design can be realized using a single permanent magnet and a soft-magnetic component having a simple shape. For example, a simple bar-shaped or cylindrical permanent magnet can be used.

The soft-magnetic component is preferably located on a side of the permanent magnet that faces the direction of the ferromagnetic object to be detected. A particularly simple design of the measuring device can be realized as a result, since the soft-magnetic component can be easily located on a front face of the permanent magnet. As a result, the Hall element can be easily located in a gap between the soft-magnetic component and the ferromagnetic object to be detected.

The soft-magnetic component is preferably formed as a cap-shaped element and has a recess to house the permanent magnet. As a result, a simple connection between the soft-magnetic component and the permanent magnet can be obtained, e.g., by magnetic forces as well. It is also possible, however, that the soft-magnetic component is interconnected with the permanent magnet by means of bonding or soldering or welding.

According to a preferred exemplary embodiment, the soft-magnetic component has a central opening that is open in the direction of the Hall element. As a result, a measuring device can be realized that has a particularly small offset field.

The soft-magnetic component preferably has a semispherical opening that is open in the direction of the Hall element. As a result of this, a minimal offset field in particular can be realized when a cylindrical bar magnet is used.

A rotationally symmetrical design is particularly favorable, since this allows the measuring device to be installed independently of the respective position of the Hall element.

The soft-magnetic component is preferably formed out of a plurality of annular disks. As a result, a measuring device according to the invention can be realized using simple components, whereby the components can be standardized and, therefore, different measuring devices for different requirements can be produced in simple fashion.

According to a preferred embodiment of the present invention, the Hall element is located between a first permanent magnet and a second permanent magnet. The second magnet is situated such that it is located between the Hall element and the ferromagnetic object to be detected. This arrangement makes it possible to produce a magnetic zero point at the position of the Hall element. In this fashion, a possibility for performing equilibration can be realized in particular.

According to a further preferred exemplary embodiment of the measuring device according to the invention, the permanent magnet is oriented parallel to the ferromagnetic object to be detected, so that its north magnetic pole and south magnetic pole lie in a plane perpendicular to the ferromagnetic object. In this case, the soft-magnetic component is located on the sides of the front faces of the permanent magnet. The Hall element is located in a gap formed in the soft-magnetic. component. A soft-magnetic component is preferably provided on both front faces of the permanent magnet. Due to this design of the soft-magnetic components and the arrangement of the permanent magnet in relation to the ferromagnetic object to be detected, a relatively large magnetic field results in the Hall element in its sensitive direction without the ferromagnetic object being present. If a ferromagnetic object comes into the vicinity of the permanent magnet, a portion of the magnetic flux is no longer directed through the soft-magnetic component and the Hall element. Instead, it is directed over the ferromagnetic object. A reduction of the magnetic field in the Hall element is obtained as a result. In this exemplary embodiment, therefore, the magnetic field in the Hall element assumes a minimal value when a ferromagnetic object comes into the vicinity of the permanent magnet.

BRIEF DESCRIPTION OF THE DRAWINGS

A plurality of exemplary embodiments of the invention are shown in the drawings and are explained in greater detail in the subsequent description.

DESCRIPTION OF THE PREFFERED EMBODIMENTS

Figure 1:
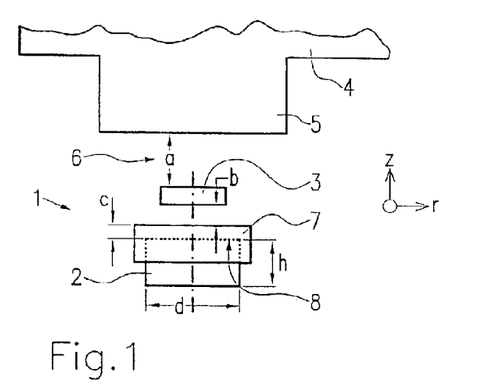
FIG. 1 is a side view through a measuring device according to a first exemplary embodiment of the present invention.

As shown in FIG. 1, a measuring device 1 according to a first exemplary embodiment of the present invention comprises a permanent magnet 2 that is developed as a bar magnet having a diameter d and a height h. Furthermore, the measuring device 1 comprises a Hall element 3 and a soft-magnetic component 7. The soft-magnetic component 7 has a cylindrical recess 8 that serves to house the permanent magnet 2. As shown in FIG. 1, up to one-half of the height h of the permanent magnet 2 is covered by the soft-magnetic component 7.

Instead of a Hall element, other magnetic field-sensitive elements can be used, such as magnetoresistive sensors (anisotropic magnetoresistive effect or giant magnetoresistive effect), field plates. Furthermore, a plurality of elements can be used as a differential connection.

As shown in FIG. 1, the Hall element 3 is located in an air gap 6 between the soft-magnetic component 7 and a tooth 5 of a trigger wheel 4 at a distance a from the tooth 5 and a distance b from the soft-magnetic component 7. The distance b should be as small as possible, preferably zero. The soft-magnetic component 7 extends past the front end of the permanent magnet 2 by an amount c.

By providing the soft-magnetic component 7 between the Hall element 3 and the permanent magnet 2, the measuring device 1 has a magnetic circuit with a very small offset field (a "back bias-reduced magnetic circuit"). The soft-magnetic component 7 acts as the flux concentrating element that shunts a portion of the magnetic flux away from the front face of the permanent magnet 2. As a result, the magnetic flux density in the air gap 6 over the front face of the permanent magnet 2 is reduced, and the Hall element 3 can be located in a region with low magnetic induction in the Z direction, i.e., the sensitive axis of the Hall element. If a tooth 5 of a trigger wheel 4 is now moved into the vicinity of the Hall element, the magnetic flux is increased in the Z direction in the Hall element 3, thereby resulting in a higher—in terms of magnitude—Hall voltage. This makes it possible to detect the presence of a tooth 5 and transmit a corresponding signal to a control device.

The values measured in a comparison of a measuring device with a soft-magnetic component 7 and without a soft-magnetic component are presented in the following tables 1 and 2. Table 1 lists the measured values for a design corresponding to the measuring device shown in FIG. 1. Table 2 lists the measured values for a measuring device without a soft-magnetic component, whereby the design of the measuring device otherwise conforms to the device shown in FIG. 1 without a soft-magnetic component.

TABLE 1

Measured values with soft-magnetic component 7

| Air gap a in mm | $B_{Z\ without\ tooth}$ in mT | $B_{Z\ with\ tooth}$ in mT | $\Delta B_Z$ (magn. fluctuation) in mT |
|---|---|---|---|
| 0 | 26.5 | 55.3 | 28.8 |
| 1.0 | 26.5 | 43.0 | 16.5 |
| 2.0 | 26.5 | 36.2 | 9.7 |
| 3.0 | 26.5 | 31.9 | 5.4 |

TABLE 1-continued

Measured values with soft-magnetic component 7

| Air gap a in mm | $B_{Z\ without\ tooth}$ in mT | $B_{Z\ with\ tooth}$ in mT | $\Delta B_Z$ (magn. fluctuation) in mT |
|---|---|---|---|
| 4.0 | 26.5 | 29.4 | 2.9 |
| 5.0 | 26.5 | 28.4 | 1.9 |

$\Delta B_Z = B_{Z\ with\ tooth} - B_{Z\ without\ tooth}$
The permanent magnet is made of samarium cobalt.
b = 1.5 mm (distance of the front face of the permanent magnet with a soft-magnetic component away from the Hall element)
$B_Z$: magnetic flux density in Z direction at the location of the Hall element

TABLE 2

Measured values without soft-magnetic component 7

| Air gap a in mm | $B_{Z\ without\ tooth}$ in mT | $B_{Z\ with\ tooth}$ in mT | $\Delta B_Z$ (magn. fluctuation) in mT |
|---|---|---|---|
| 0 | 22.7 | 39.8 | 17.1 |
| 1.0 | 22.7 | 32.6 | 9.9 |
| 2.0 | 22.7 | 28.8 | 6.1 |
| 3.0 | 22.7 | 26.7 | 4.0 |
| 4.0 | 22.7 | 25.2 | 2.5 |
| 5.0 | 22.7 | 24.5 | 1.8 |

The permanent magnet is made of hard ferrite.
b = 2.5 mm (distance of the front face of the permanent magnet away from the Hall element)
$B_Z$: magnetic flux density in Z direction at the location of the Hall element
$\Delta B_Z = B_{Z\ with\ tooth} - B_{Z\ without\ tooth}$ As demonstrated by a comparison of the measured values in Table 1 and Table 2, the measuring device according to the invention having a soft-magnetic component 3 has a markedly higher change $\Delta B_Z$ in the magnetic field in the presence of a comparably low offset magnetic field ($B_{Z\ without\ tooth}$=26.5 mT: $B_{Z\ without\ tooth}$=22.7 mT). In fact, $\Delta B_Z$ with the soft-magnetic component is approximately 35% greater, on average, than the value $\Delta B_Z$ without the soft-magnetic component in the air gap range of interest of approximately 1 mm to 4 mm. According to the invention, the presence of a ferromagnetic object in the region of the measuring device can therefore be detected with greater certainty due to the greater relative change in magnetic induction B, and the distance of the ferromagnetic object can be determined with greater accuracy.

Figure 2:
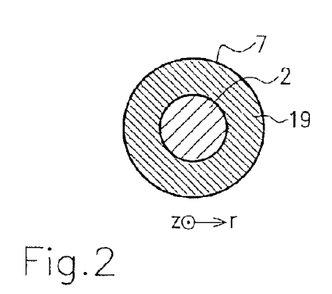
FIG. 2 is a top view of a measuring device according to a second exemplary embodiment of the present invention.

FIG. 2 shows a top view of a measuring device according to a second exemplary embodiment of the present invention. To improve clarity, the Hall element is not shown. The measuring device according to the second exemplary embodiment basically corresponds to the first exemplary embodiment. The difference is that the measuring device according to the second exemplary embodiment has a center through-opening 19 in the soft-magnetic component 7. As a result, the top region of the soft-magnetic component 7, i.e., the region directed toward the Hall element 3, has a cylindrical annular shape.

Figure 3:
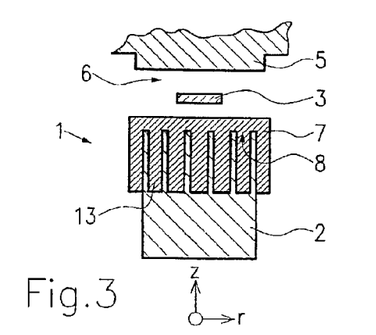
FIG. 3 is a side view through a measuring device according to a third exemplary embodiment of the present invention.

A measuring device according to a third exemplary embodiment of the present invention is shown in the schematic side view of FIG. 3. The design of this measuring device basically corresponds to the measuring device shown in FIG. 1. The difference is that the soft-magnetic component 7 is designed differently. It has, in addition, longitudinal recesses 13 on its outer circumferential edge that are formed on the entire circumference of the soft-magnetic component 7. This results in production-engineering advantages. By means of this recess, another magnetic flux density is obtained in the region of the Hall element 3 when a ferromagnetic object or tooth 5 is not present.

Figure 4:
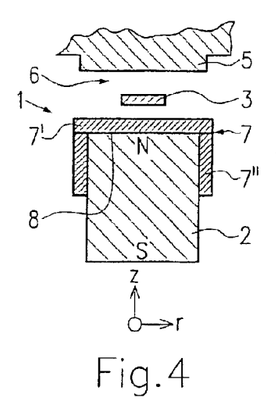
FIG. 4 is a side view of a measuring device according to a fourth exemplary embodiment of the present invention.

FIG. 4 shows a sectional view of a measuring device according to a fourth exemplary embodiment of the present invention. In contrast to the exemplary embodiments described previously, the soft-magnetic component 7 is not designed as a single component. As shown in FIG. 4, the soft-magnetic component 7 has a cover 7' and an annular cylindrical portion 7" that surrounds a part of the permanent magnet.

Figure 5:
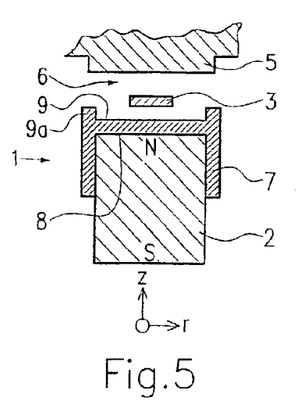
FIG. 5 is a sectional drawing through a measuring device according to a fifth exemplary embodiment of the present invention.

FIG. 5 is a schematic sectional drawing of a measuring device 1, according to the invention, according to a fifth exemplary embodiment. In the case of this exemplary embodiment, the soft-magnetic component 7 is designed in such a fashion that, in addition to the recess to house the permanent magnets 2, it also has a recess 9 with the wall 9a located on the front face of the soft-magnetic component 7. As shown in FIG. 5, the Hall element 3 can also be partially located in the recess 9. The component 7 can also be composed of a plurality of parts.

Figure 5A:
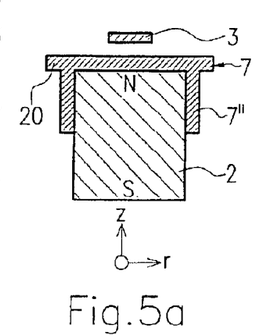
FIG. 5a is a sectional drawing through a further variant.

In the variant according to FIG. 5a, the component 7 has a peripheral projection 20. This projection 20 extends beyond the annular cylindrical portions 7". In terms of function, the projection 20 corresponds to the wall 9a in FIG. 5. As a result, magnetic saturation in the edge regions, i.e., in the region of the transition in component 7 from the front face to the shell regions, is prevented.

Figure 6:
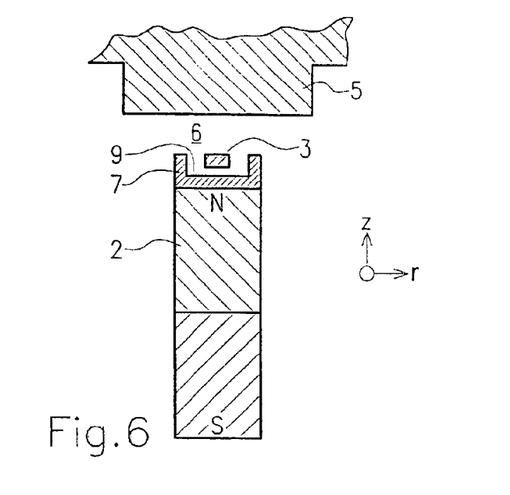
FIG. 6 is a sectional drawing through a measuring device according to a sixth exemplary embodiment of the present invention.
Figure 7:
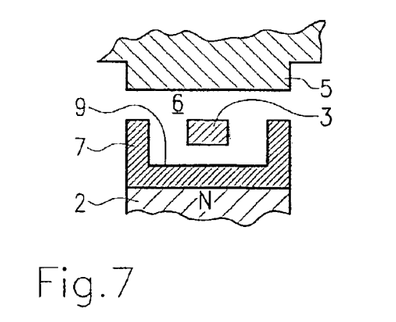
FIG. 7 is an enlarged partial sectional drawing of the measuring device shown in FIG. 6.

A sixth exemplary embodiment of the measuring device 1 according to the invention is shown in FIGS. 6 and 7. The difference from the measuring device shown in FIG. 5 is that the soft-magnetic component 7 does not have a recess to house the permanent magnet. Instead, it is located directly on the front face of the permanent magnet 2. The soft-magnetic component 7 also has a recess 9 that is open toward the tooth 6, in which the Hall element 3 is at least partially located.

Figure 8:
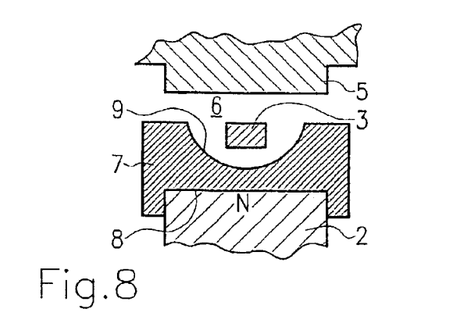
FIG. 8 is a sectional drawing through a measuring device according to a seventh exemplary embodiment of the present invention.

FIG. 8 shows a seventh exemplary embodiment of a measuring device according to the present invention. This exemplary embodiment basically corresponds to the exemplary embodiment shown in FIG. 7 with the exception that the recess 9 of the soft-magnetic component 7 is designed semispherical in shape. Another shape of a recess would also be possible, e.g., a truncated cone, spherical, conical, etc. It is important that a reduction in thickness is obtained in this region. The recess should be located in the center. Again, the Hall element 3 is partially located in this recess 9 open toward the air gap 6. In every exemplary embodiment, the Hall element can also be located over the recess or over the component 7. Furthermore, the soft-magnetic component 7 has a recess 8 to partially house the permanent magnet 2.

Figure 9:
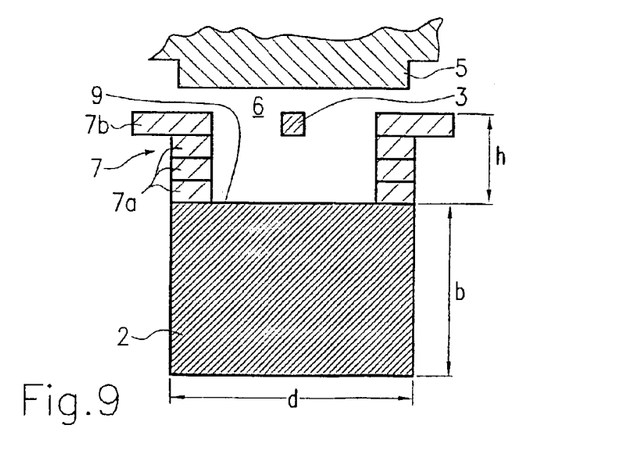
FIG. 9 is a sectional drawing through a measuring device according to an eighth exemplary embodiment of the present invention.
Figure 10:
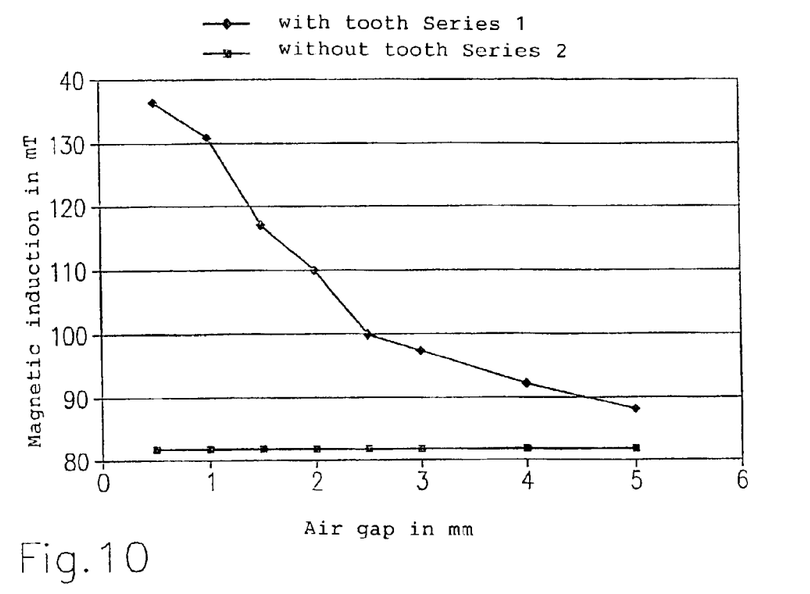
FIG. 10 is an illustration of the dependence of magnetic induction on the width of the air gap in the case of the exemplary embodiment shown in FIG. 9.

FIG. 9 is a schematic illustration of a measuring device according to an eighth exemplary embodiment of the present invention. The soft-magnetic component 7 is developed out of a plurality of annular disks 7a and 7b. The annular disk 7b has a somewhat greater diameter than the annular disk 7a so that the Hall element 3 can be adjusted. The height h from the top front face of the permanent magnet 2 to the outer surface of the Hall element 3 (i.e., to the surface facing the tooth 5) is h=2.5 mm. The diameter of the permanent magnet d was d=7 mm, and the height b of the permanent magnet 2 was b=4.0 mm. A $Sm_2Co_{17}$ permanent magnet was used. When the measurements were performed, the values for magnetic induction B as a function of the width of the air gap from the outer surface of the Hall element 3 to the surface of the tooth 5 were obtained. Series 2 shows the values obtained without the tooth 5 being present in the region of the Hall element 3. Series 1 shows the values obtained when a tooth was present. As illustrated in FIG. 10, every time a tooth was present in the vicinity of the measuring device, a marked change in magnetic induction B took place.

Figure 11:
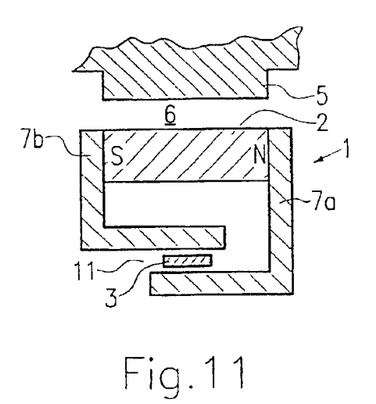
FIG. 11 is a sectional drawing through a measuring device according to a ninth exemplary embodiment of the present invention.

FIG. 11 shows a measuring device, according to the invention, according to a ninth exemplary embodiment. As shown in FIG. 11, the front face of the bar-shaped permanent magnet 2 is not facing in the direction of the tooth 5. Instead, it is arranged with its longitudinal side parallel with the tooth 5. Two L-shaped, soft-magnetic components 7a and 7b located on the front faces of the permanent magnet 2 in each case at the north magnetic pole and the south magnetic pole are provided as the soft-magnetic component. A gap 11 that is arranged parallel with the magnet 2 is formed between the two legs of the L-shaped, soft-magnetic components 7a and 7b. A Hall element 3 is located in this gap. If a tooth 5 is not located in the vicinity of the permanent magnet 2, a large magnetic flux travels from the permanent magnet 2 over the first soft-magnetic component 7a, over the gap 11 to the second soft-magnetic component 7b and back to the permanent magnet 2. As a result, high magnetic induction results in the Hall element 3 when a tooth 5 is not present in the region of the permanent magnet 2. If a ferromagnetic tooth 5 is now moved into the vicinity of the permanent magnet 2 (refer to FIG. 11), at least a portion of the magnetic flux extends over the gap 6 to the tooth 5 and back to the permanent magnet 2. As a result, the magnetic field induced in the Hall element 3 is reduced. In the case of the ninth exemplary embodiment shown in FIG. 11—in contrast to the exemplary embodiments described previously—the magnetic field in the Hall element 3 takes on a minimal value when a tooth 5 is present in the region of the permanent magnet 2.

Figure 12:
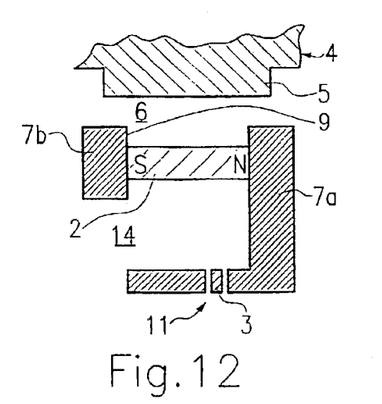
FIG. 12 is a sectional drawing through a measuring device according to a tenth exemplary embodiment of the present invention.

FIG. 12 shows a tenth exemplary embodiment of the measuring device according to the invention. This exemplary embodiment basically corresponds to the exemplary embodiment shown in FIG. 11, but the soft-magnetic element is designed differently. As shown in FIG. 12, the soft-magnetic element is formed out of an L-shaped, soft-magnetic component 7b and a bar-shaped, soft-magnetic component 7b. A recess 14 is formed in the leg of the soft-magnetic component 7a, in which said recess a Hall element 3 is located. As shown in FIG. 12, in the present exemplary embodiment, the magnetic flux travels from the permanent magnet 2 over the soft-magnetic component 7a, the Hall element 3, over a gap 11 formed between the two soft-magnetic components 7a and 7b to the soft-magnetic component 7b, and back to the permanent magnet 2. Once more, the soft-magnetic components 7a and 7b are located on both front faces in each case of the permanent magnet 2, at the north magnetic pole and the south magnetic pole. The two soft-magnetic components 7a and 7b are situated on the permanent magnet 2 in such a fashion that they partially project into the air gap 6 between the trigger wheel 4 and the permanent magnet 2 in order to form a recess 9.

Figure 13:
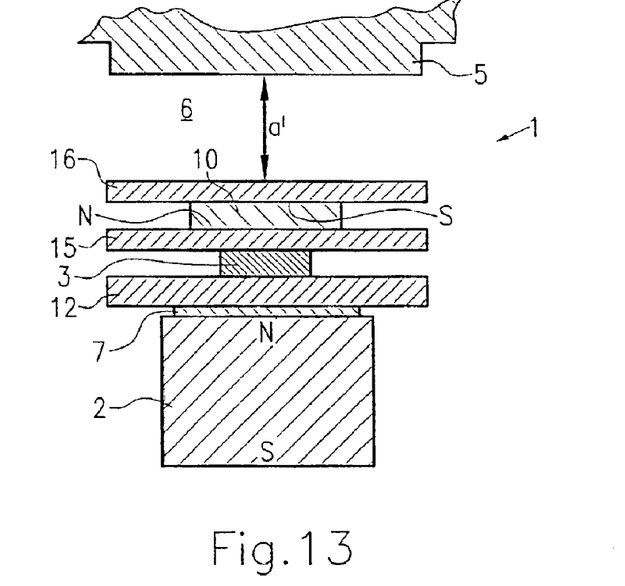
FIG. 13 is a sectional drawing through a measuring device according to an eleventh exemplary embodiment of the present invention.

An eleventh exemplary embodiment of a measuring device 1 according to the invention is shown in FIG. 13. As shown in FIG. 13, the measuring device 1 comprises a first permanent magnet 2 and a second permanent magnet 10. A 0.5 mm-thick layer 15, 16 made of magnetically inactive material is located on each of the front faces of said second permanent magnet. Furthermore, a Hall element 3 secured to a printed-circuit board is provided.

As shown in FIG. 13, the printed-circuit board 12 is secured to a soft-magnetic component 7, so that the soft-magnetic component 7 is located between the first permanent magnet 2 and the Hall element 3. The second permanent magnet 10 is then located between the Hall element 3 and a tooth 5 of a trigger wheel. The following are therefore located between the permanent magnet 2—made of samarium cobalt, for example—and the tooth 5, starting at the permanent magnet 2: the soft-magnetic, plate-shaped component 7 having a thickness of approximately 0.2 mm, the printed-circuit board 12 having a thickness of approximately 1 mm, the Hall element 3 having a thickness of approximately 0.7 mm, a first layer 15 made of RESITEX having a thickness of approximately 0.5 mm, the second permanent magnet having a thickness of approximately 2.5 mm, and a second layer 16 made of RESITEX having a thickness of 0.5 mm.

Figure 14:
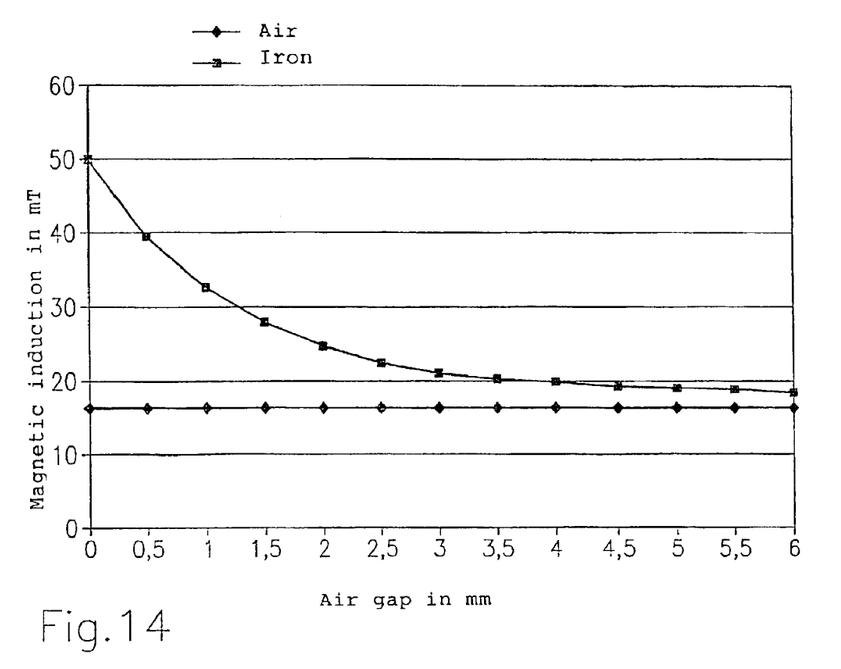
FIG. 14 illustrates the dependence of magnetic induction on the width of the air gap in the case of a measuring device according to the exemplary embodiment shown in FIG. 13.

The magnetic inductions obtained in the Hall element 3 using this design are shown in FIG. 14. The magnetic induction is hereby plotted as a function of the width b of the air gap 6 between the tooth 5 and the front face of the magnet structure formed by the layer 16.

Figure 15:
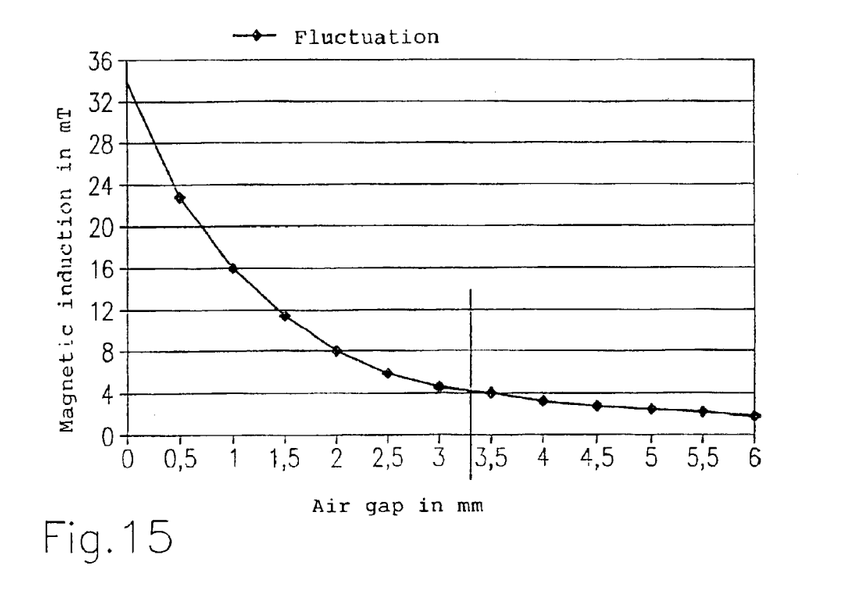
FIG. 15 illustrates the dependence of the magnetic fluctuation on the width of the air gap of the measuring device shown in FIG. 13.

In FIG. 15, the magnetic fluctuation in the presence of a ferromagnetic object 5 in the region of the measuring device 1 is shown separately once more as a function of the width b of the air gap 6.

As illustrated in the two graphs in FIGS. 14 and 15, a relatively great magnetic fluctuation occurs in the region of the air gap width b between 1 and 4 mm in each case that is important for the practical application in particular. This magnetic fluctuation occurs in the presence of a relatively small offset field (when a ferromagnetic object is not present in the region of measuring device 1) of approximately 17 mT (refer to FIG. 14). The measuring device according to the exemplary embodiment shown in FIG. 13 therefore represents a Hall sensor having a very low offset field, so that disturbances due to electromagnetic incompatibility can be minimized.

In accordance with the variants described previously, the component 7 can be developed on the magnet 2, on the magnet 10 or on both.

Figure 16:
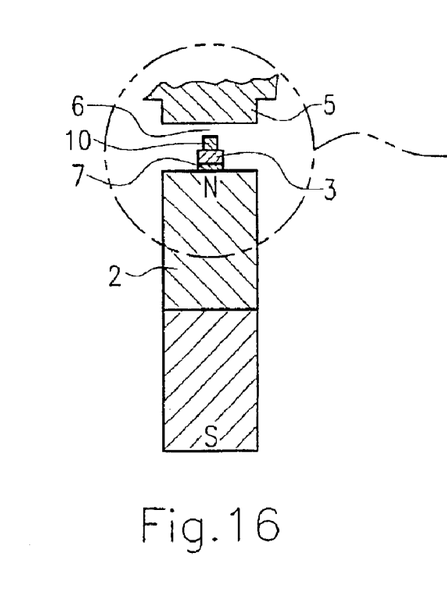
FIG. 16 is a sectional drawing through a measuring device according to a twelfth exemplary embodiment of the present invention.
Figure 17:
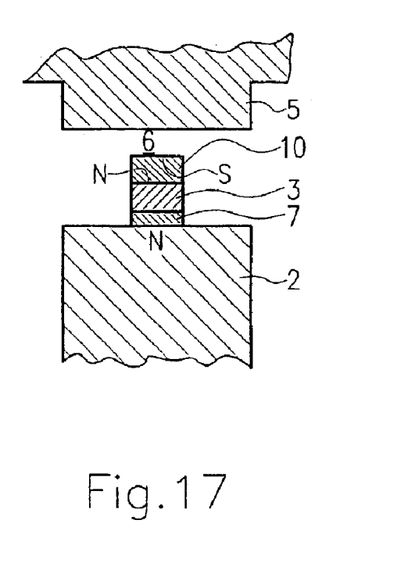
FIG. 17 is an enlarged sectional drawing of the measuring device shown in FIG. 16.

A twelfth exemplary embodiment according to the present invention is shown in FIGS. 16 and 17. As shown in FIG. 17 in particular, the measuring device 1 also has a first permanent magnet 2 and a second permanent magnet 10. A Hall element 3 and a soft-magnetic component 7 are located between the first and second permanent magnets 10. The soft-magnetic component 7 is in contact with the first permanent magnet 2, while the Hall element 3 is in contact with the second permanent magnet 10. The two permanent magnets 2 and 10 are arranged in such a fashion that their two north magnetic poles face each other on the front faces. In accordance with the exemplary embodiment described hereinabove, an air gap 6 is provided between the second permanent magnet 10 and a tooth 5 of a trigger wheel. The function of the exemplary embodiment shown in FIGS. 16 and 17 basically corresponds to that of the eleventh exemplary embodiment shown in FIG. 13, so that reference can be made to the descriptions there.

In summary, a measuring device 1 for contactless detection of a ferromagnetic object 4, 5 was described. The measuring device comprises a Hall element 3 and at least one permanent magnet 2, whereby a magnetically non-conductive air gap 6 is located between the Hall element and the permanent magnet. Furthermore, the permanent magnet 2 has a soft-magnetic component 7 on at least one of its front faces that is located in the air gap 6 between the permanent magnet 2 and the Hall element 3.

The preceding description of the exemplary embodiments according to the present invention are intended for purposes of illustration only and not to limit the invention. Various changes and modifications are possible within the framework of the invention without leaving the scope of the invention or its equivalents.

What is claimed is:

1. A measuring device for contactless detection of a ferromagnetic object, comprising at least one magnet; a magnetic field-sensitive element arranged so that an air gap is provided between the magnetic field-sensitive element and the ferromagnetic object; a soft-magnetic component located between the magnet and the magnetic field-sensitive element on a face of the magnet which points in a direction of the ferromagnetic object to be detected, the soft-magnetic component being formed as a cap-shaped element that has a recess that is open in a direction away from the magnetic field-sensitive element to house said magnet and opening that is open in a direction of the magnetic field-sensitive element, said soft-magnetic component having a first side wall defining said recess and also having a portion which forms a second side wall defining the opening, said first side wall and said second side wall being in alignment with one another.

2. A measuring device as defined in claim 1, wherein said opening is formed as a semi spherical opening.

3. A measuring device as defined in claim 1, wherein said magnetic field-sensitive element is arranged at least partially in said opening.

4. A measuring device as defined in claim 1, wherein said soft-magnetic component has a throughgoing opening.

5. A measuring device as defined in claim 1, wherein said soft-magnetic component is composed of a plurality of annular discs.

6. A measuring device for contactless detection of a ferromagnetic object, comprising at least one magnet; a magnetic field-sensitive element arranged so that an air gap is provided between said magnetic field-sensitive element and the ferromagnetic object; a soft-magnetic component located between said magnet and said magnetic field-sensitive element on a face of said ma net which points in a direction of the ferromagnetic object to be detected, said soft-magnetic component being formed as a cap-shaped element that has a recess that is open in a direction away from said magnetic field-sensitive element to house said magnet and opening that is open in a direction of said magnetic field-sensitive element, said soft-magnetic component having a first side wall defining said recess and also having a portion which forms a second side wall defining said opening, said first side wall and said second side wall being in alignment with one another, wherein a cap of said soft magnetic component has an outer circumferential edge provided with longitudinal recesses in a region of said magnet.

* * * * *